United States Patent [19]

Alten

[11] Patent Number: 5,064,274

[45] Date of Patent: Nov. 12, 1991

[54] AUTOMATIC AUTOMOBILE REAR VIEW MIRROR ASSEMBLY

[75] Inventor: Ralph W. Alten, Arnold, Mo.

[73] Assignee: Siegel-Robert, Inc., St. Louis, Mo.

[21] Appl. No.: 331,647

[22] Filed: Mar. 30, 1989

Related U.S. Application Data

[63] Continuation-in-part of Ser. No. 89,744, Aug. 26, 1987, Pat. No. 4,828,361.

[51] Int. Cl.$^5$ ............................................. G02B 7/198
[52] U.S. Cl. .................................. 359/604; 250/210; 359/872; 359/877
[58] Field of Search ............... 350/279, 280, 281, 605, 350/631, 632, 633, 637; 250/210

[56] References Cited

U.S. PATENT DOCUMENTS

| | | | |
|---|---|---|---|
| 4,580,875 | 4/1986 | Bechtel et al. | 350/281 |
| 4,793,690 | 12/1988 | Gahan et al. | 350/279 |
| 4,799,768 | 1/1989 | Gahan | 350/279 |
| 4,820,933 | 4/1989 | Hong et al. | 350/379 |
| 4,917,477 | 4/1990 | Bechtel et al. | 350/283 |
| 4,948,242 | 8/1990 | Desmond et al. | 350/381 |

OTHER PUBLICATIONS

Traister et al., *Encyclopedic Dictionary of Electronic Terms*, 1984, p. 100, "Bridge Circuit, Resistance".
Considine, *Van Nostrand's Scientific Encyclopedia*, 7th Ed., vol. 1, "Bridge Circuits", 1989, pp. 432–437.

*Primary Examiner*—Paul M. Dzierzynski
*Assistant Examiner*—Martin Lerner

*Attorney, Agent, or Firm*—Armstrong, Teasdale, Schlafly & Davis

[57] ABSTRACT

A variable reflectivity automobile mirror assembly is operable by automatic electrical circuitry responsive to variations of incident light upon the mirror and ambient light level about the automobile to provide positions of high and low reflectivity. The assembly also includes a support member or housing, a reflective mirror panel, motor means, actuation means secured to the housing and driven by the drive element of the motor, and a timed-drive circuit for directing the current through the motor in opposite directions to move the mirror between the two positions. the automatic circuitry can include photosensing means and means to combine the output of the photosensing means and to compare it to an independent source. The circuit can position the mirror in response to the output of the comparing means. The circuit can have means to automatically adjust the sensitivity of the circuit so that the incident light level needed to move the panel from the higher or lower reflectivity orientation decreases as ambient light level decreaases. This can be provided by the first and second photosensing means being part of an electrical bridge. Means are also provided to integrate the photosensing signals at different rates. A summer means can add the integrated signals. Means for preventing the mirror switching from a lower to a higher reflectivity position for a short time interval following switching to a lower reflectivity position is also provided. The present invention also includes circuitry for manual actuation of the mirror.

28 Claims, 10 Drawing Sheets

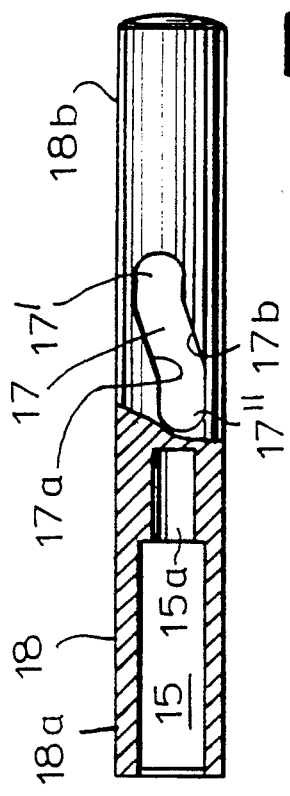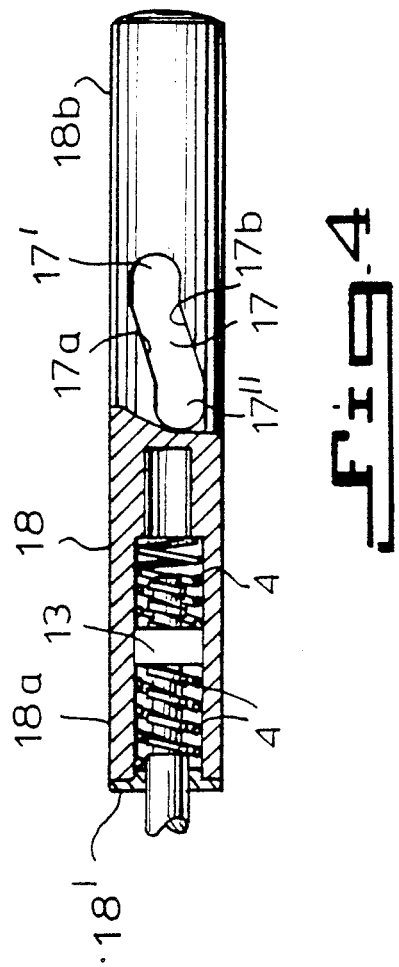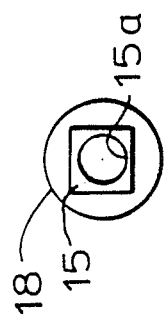

AUTOMATIC AUTOMOBILE REAR VIEW MIRROR ASSEMBLY

BACKGROUND OF THE INVENTION

This is a continuation-in-part of application Ser. No. 89,744, filed Aug. 26, 1987, now U.S. Pat. No. 4,828,361 issued May 9, 1989.

The present invention relates to rearview mirror assemblies for automobiles and other road vehicles, and, in particular, to rear view mirror assemblies which provide high reflectivity position and low reflectivity position for night time conditions. More particularly the invention relates to providing an electronic circuit for automatically adjusting such a mirror to a high or low reflectivity position, depending on the ambient light conditions and upon the amount of light directed against the mirror's surface.

Many conventional rear view mirror assemblies employ prismatic mirrors which can be positioned by the vehicle operator in a high reflectivity or low reflectivity position. Such prismatic mirrors can be movably driven by a mechanical actuator mounted, for example, on the housing of the mirror assembly, or by an electronic circuit having a motor or solenoid driven actuator to manipulate the mirror or mirror/housing combination between the low and high reflectivity dispositions.

U.S. Pat. No. 4,580,875 to Bechtel et al. discloses an electronic system for automobile rearview mirrors. The Bechtel patent uses one photoelectric cell to detect the forward incident ambient light level and a second photoelectric cell to detect incident light levels directed toward the rear of the vehicle.

The Bechtel circuitry directly compares the input from the forward cell to that of the rear cell by a comparator. Bechtel has a separate circuit for the purpose of detecting daylight conditions, which uses a comparator designated U1. Bechtel also uses two integrated circuits to determine the reflectivity state of the mirror. Bechtel requires a manual control to set the switching level caused by incident light.

U.S. Pat. No. 4,443,057, which issued to Bauer et al., discloses an automobile rear view mirror whose housing is moved by an eccentric cam driven by a uni-directional DC motor. The energization of the DC motor is controlled by limit switches, which switches sense when the mirror is in the low and high reflectivity dispositions. The limit switches cut off current to the DC motor. The use of limit switches is typical of many conventional automotive rear view mirror assemblies.

There are numerous inherent disadvantages associated with the use of limit switches. First, the housing of the rear view mirror provides limited space for carrying the electronic circuitry and mechanical structure associated with moving the mirror between the low and high reflectivity dispositions. A pair of limit switches usually require associated gearing, camming or other structure to actuate the switches, and such structure takes up an inordinate amount of space. Second, the mechanisms used for actuating and mounting the switches are relatively complex, making assembly and repair of the rear view mirror assembly difficult and time consuming.

U.S. Pat. No. 3,680,951 to Jordan et al. discloses a photoelectronically controlled rear view mirror which includes a first photocell to switch the mirror between "normal" and "adjusted" positions in response to incident light on the mirror, and a second photocell to monitor ambient light thereby preventing switching of the mirror to the "adjusted" position during daylight hours and at night where high ambient light conditions exist. Jordan et al. utilize a pair of permanent magnets in combination with an electromagnet therebetween in which polarity can be alternated to drive a cam back and forth, which, in turn, moves a projection bearing thereagainst in order to adjust a mirror between positions of high and low reflectivity. The solenoid of Jordan et al. must be continually energized to maintain the mirror in the desired orientation.

Other disclosures for mechanically changing the reflectivity orientation of rear view mirrors variously include electromagnetic means and pivotal base mounted mirrors, etc.

The prior art noted above does not disclose an automatic sensitivity adjustment for a rear view mirror.

Thus, it is an object of the present invention to provide a rear view mirror assembly which can be efficiently manufactured to provide smooth and dependable switching between positions of high and low reflectivity.

It is also an object of the present invention to provide an electronic control circuit to provide automatic control for a motor driven rear view mirror assembly, and to provide for automatic adjustment of the light sensitivity of the circuit.

It is a further object of the present invention to provide an automatic control circuit for an automobile rear view mirror assembly, which control circuit is relatively simple and reliable and takes up relatively little space in the housing of the rear view mirror assembly.

Moreover, an object of the present invention is to use a photosensing means to automatically control positioning a rear view mirror in a high or low reflectivity position dependent upon the amount of light detected by the photosensors.

Additionally, it is an object of the invention to provide a photosensing bridge circuit for efficient and effective adjustment of mirror positions. To provide a photosensing circuit that avoids undesirable and distracting mirror movement is also an objective.

A further object is to provide a photosensing circuitry which does not require a separate circuit to determine daylight conditions. An object as well is to provide circuitry which sums outputs from photosensors and compares the output with another source.

It is further an object to provide an automatic circuit having means to prevent an undesirable change in the mirror position during a sudden change in the ambient light level in appropriate circumstances, such as upon entry into a tunnel during daylight hours. It is moreover an object to provide means to allow for quick changeover from a high to a low reflectivity state in appropriate situations, such as when headlights from a trailing car are incident on the mirror. It is furthermore an object to provide automatic circuitry whereby during daylight hours, switchovers from a high to a low reflectivity position are prevented, such as when headlights are incident upon the mirror during light ambient conditions.

It is further an object to provide means to achieve desirable reflectivity changeover when incident light levels are changing during low ambient light level conditions. It is an object to provide means to allow for quick changeover from a high to a low reflectivity state when headlights from a trailing car are incident on the mirror during low ambient light conditions. Yet the circuit will prevent switching from low reflectivity to high reflectivity within a short time after having switched to the low reflectivity position, to thus prevent continuous switching during low ambient light conditions at times when incident light is sporadic.

It is yet another object of the present invention to provide an automatic mirror control circuit for an automobile rear view mirror assembly which overcomes the inherent disadvantages of conventional rear view mirror assemblies.

SUMMARY OF THE INVENTION

In accordance with the present invention a variable reflectivity mirror assembly is provided which is operable to provide high and low reflectivity orientations. The assembly includes a support member for securing the assembly to a structure which is immovable relative to the assembly, a housing mounted on the support member, a reflective panel such as a prismatic mirror, connected to the support member for rotation between the high and low reflectivity orientations, such panel having a first side which provides the high reflectivity and a second side which provides low reflectivity. The assembly also includes motor means mounted in the housing which includes a drive element movable in opposite directions in response to oppositely directed currents applied to the motor, and actuation means secured to the housing for driving engagement with the drive element to rotate the reflective panel between the high and low reflectivity orientations.

The present assembly also includes a timed-drive circuit means for directing current through the motor in one of the opposite directions in response to orientation selection means for a predetermined period of time sufficient to drive the actuation means to a selected orientation.

The motor can be a bi-directional rotary motor which has a drive shaft that is drivingly connected with the mirror to move the mirror to and from high or low reflectivity positions.

The assembly includes a motor control circuit for an automobile rear view mirror assembly which provides current to a reversible DC motor of the assembly for a predetermined duration to drive the reflective panel between a high reflectivity and low reflectivity orientation.

The motor control circuit can include means for manual operation, such as a momentary contact switch which is actuatable by the vehicle operator to alternately position the mirror in the high reflectivity or low reflectivity orientation. The switch is coupled to a toggle circuit, which circuit provides first and second logic output signals which are in alternate states and which change states in response to actuation of the switch.

First and second timing circuits are coupled to the toggle circuit. Each of the first and second timing circuits provides a pulsed output signal in response to the first and second outputs of the toggle circuit, respectively. The pulsed output signals of the timing circuits are of a predetermined duration, and effect the energization of the motor for substantially the predetermined duration of the pulsed output signals.

The motor control circuit also includes first and second motor drive circuits. The first and second motor drive circuits are coupled to the first and second timing circuits, respectively, and are responsive to the pulsed output signals of the timing circuits. The first and second drive circuits are coupled to the motor and selectively provide energizing current bi-directionally to the motor to effect motor movement alternately in a forward and a reverse direction for substantially the predetermined duration of the pulsed output signals of the first and second timing circuits.

The circuit can work in an automatic fashion through photosensor detection of light. The photosensors are connected to the circuit so that the mirror can be positioned in a high or low reflectivity position dependent upon the light condition faced by a driver. Signals from the photosensors representative of the light levels can be combined and then compared to another source, rather than comparing those signals to each other with a comparator. The signals that are combined can be from a photosensor that detects ambient light, and from a photosensor that detects incident light upon the mirror. The output of the comparing means can control the motor and drive element to position the mirror in the higher or lower reflectivity position.

Means are also provided for automatically adjusting the sensitivity of the circuit so that the amount of incident light needed to move the mirror from the higher to the lower reflectivity position varies with the change in ambient light. The automatic sensitivity adjustment eliminates the need for a separate daylight detection circuit, such as that used in the said Bechtel patent. In am embodiment, the automatic sensitivity is accomplished by the photosensors being part of an efficient and effective bridge network. The invention also provides circuitry in which the level of light striking the rear facing sensor does not affect the reflectivity orientation of the mirror, so that switchovers from a high reflectivity to a low reflectivity position are prevented during daylight conditions.

The automatic circuitry has means to prevent an undesirable change in the mirror position during a sudden change in the ambient light level in appropriate circumstances, such as upon entry into a tunnel during daylight conditions. This means can include a long-time integration circuit. The circuitry can also include means to allow for quick changeover from a high to a low reflectivity state, under certain low ambient light level conditions, such as when headlights from a trailing car impinge on the mirror. Such means can include a short time integration circuit.

The circuit also has means to delay switching from a low reflectivity to a high reflectivity position after switching to a low reflectivity position. This prevents continuous and quick switching back and forth between low and high reflectivity positions during times when incident light is sporadic, such as during low ambient light conditions. Such means can include a hysteresis loop.

As a result of the present invention, an automatic rear view mirror assembly can be provided which automatically and efficiently selects high and low reflectivity orientations, but which can be manually overridden to a selected orientation.

BRIEF DESCRIPTION OF THE DRAWINGS

FIG. 3 is a plan view in partial section of the actuation means between the motor drive element and the base portion shown in FIG. 2a and 2b;

FIG. 3a is an end view of the left-hand side of the actuator means shown in FIG. 3 in whole;

FIG. 4 is a plan view in partial section similar to that shown in FIG. 3, but includes the actuator completely assembled with a drive gear inserted therein;

DETAILED DESCRIPTION OF THE INVENTION

The Assembly

Figure 1:
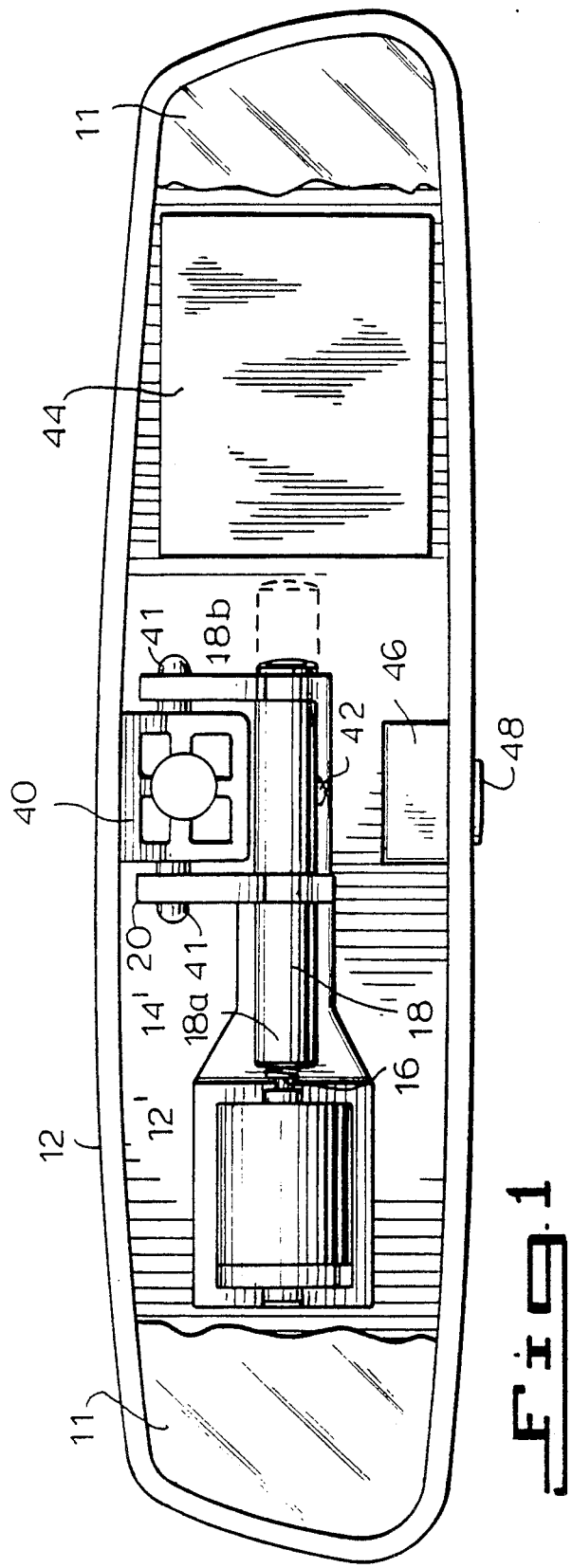
FIG. 1 is a side elevational schematic of the assembly of a rear view mirror assembly constructed in accordance with the present invention.
Figure 12:
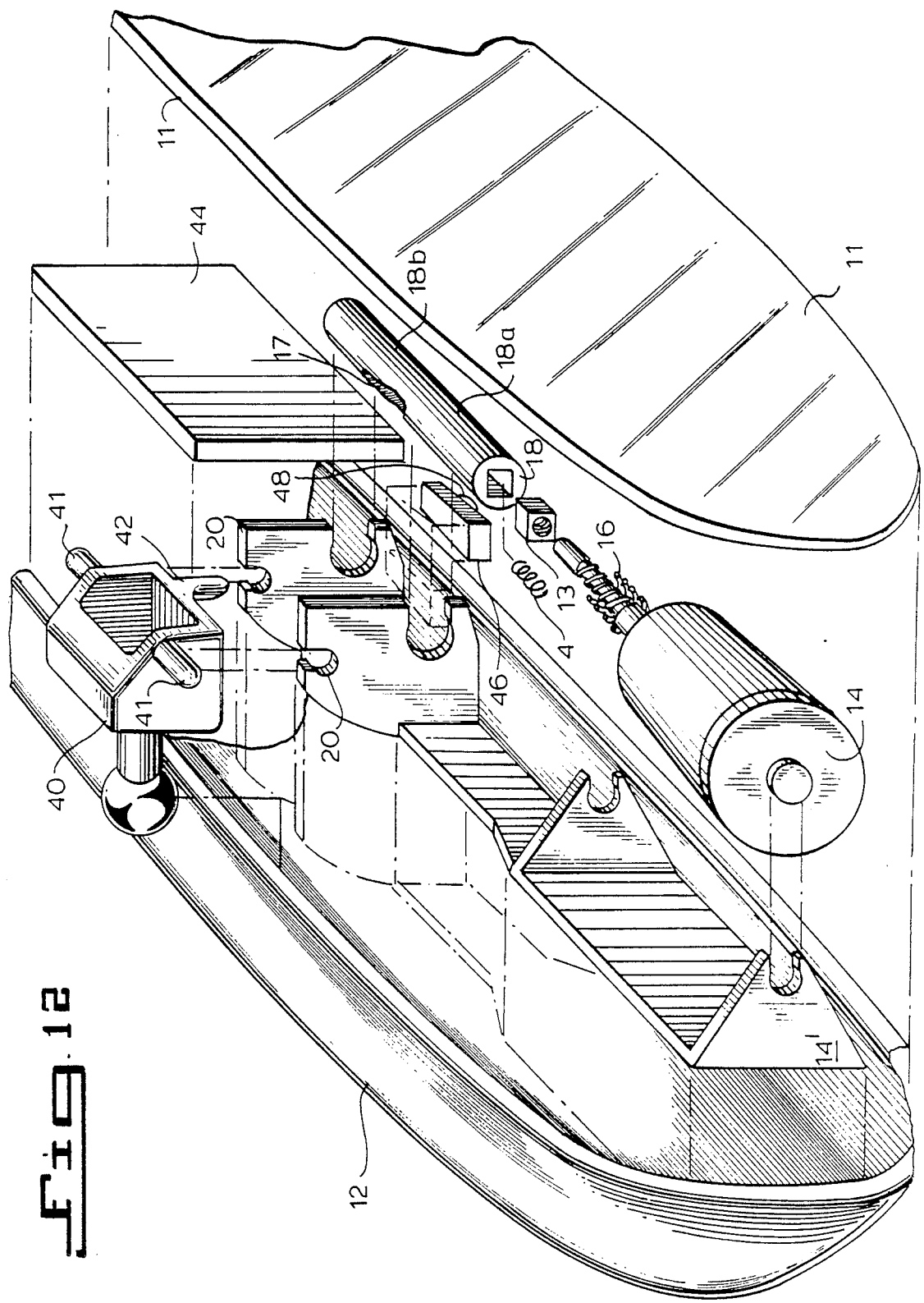
FIG. 12 is a partial exploded perspective view of the assembly in accordance with the present invention.

Referring to FIGS. 1 and 12, an assembly 10 as shown constructed in accordance with the invention can be seen therein. The assembly includes in general a housing 12 on which have been rigidly mounted by means of bracket 14', a bi-directional DC motor 14 having a drive element shown therein as a worm gear 16. The worm gear 16 extends from the motor 14 to an actuator such as cam rod assembly 18 which is also rigidly fixed to the housing 12. The cam rod assembly 18, in turn, has a drive end 18a seen on the left-hand side of the assembly and a camming end 18b shown on the right-hand side of the assembly. When the cam rod assembly 18 is driven by the motor 14 through worm gear 16, the cam rod assembly is driven back and forth from right to left. The phantom lines shown extending from the right end of the cam rod assembly in FIG. 1 depict the farthest point of travel of the assembly.

The housing also has trunnions 20 spaced apart in the center of the housing for receipt of a support member 40 therein. In order to assemble the frame 12 onto the support, it is necessary to insert, such as by snap fitting, arms 41 of the support member 40 into trunnions 20. The support member 40 also has a projection 42 extending from beneath the main body of the member 40 for receipt by the cam rod 18.

The assembly 10 also includes a circuit board 44 as well as an actuating switch S1 having a housing 46 and a switch head portion 48 resembling an oversized button which can be easily operated to control the position of the rear view mirror by a passenger.

In the embodiment shown herein, a mirror 11 having a trapezoidal cross section and consequently modes of high and low reflectivity is fixed to the frame 12 for simultaneous movement therewith. Furthermore, the cam rod assembly 18 is fixed to the back of housing 12 so that upon movement of the cam rod assembly, the housing is likewise moved therewith.

Figure 2B:
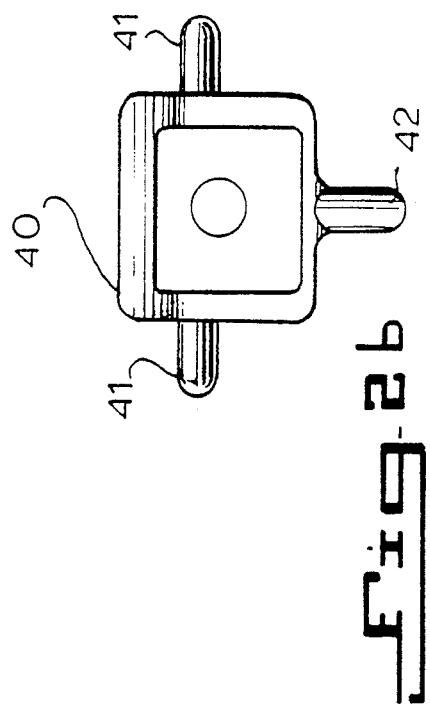
FIG. 2a and 2b are side elevational and front elevational views, respectively, of a part of the support which holds the housing for pivotal movement.
Figure 2A:
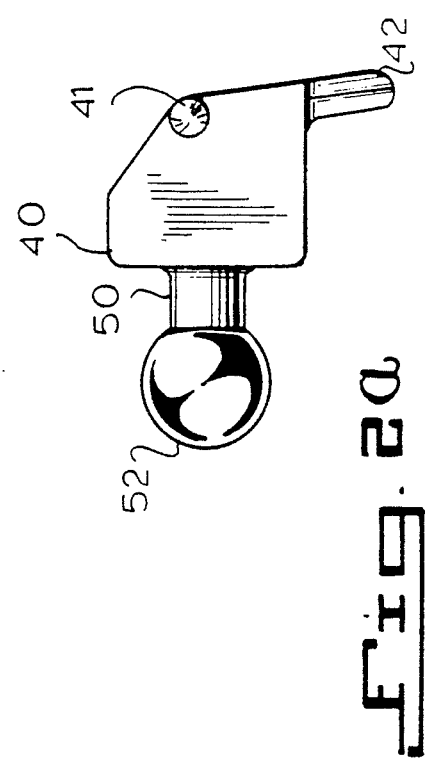

Referring now to FIGS. 2a and 2b, the interconnecting support member 40 is shown in greater detail. In FIG. 2a the support member 40 is shown having a stem 50 which extends to a ball 52 which is connected with, for example, a windshield support by means of a ball socket for mating relationship with the ball 52. Stem 50 and ball 52 extend from the back of the frame 12 so that the rear view mirror can be adjusted for individual passenger viewing. The housing is attached to the support member by means of side arms 41 which can be fitted into trunnions 20 which are fixed to the housing of the rear view mirror. Furthermore, projection 42 extends from beneath the body of the member 40 for insertion into a diagonal slot 17 in the cam rod assembly 18, which shall be explained in greater detail hereinbelow. In operation, the member 40 remains in place with the windshield support while the rear view mirror is caused to actuate by pivoting around the side arms 41. To this end, it has been found suitable to mount the side arms 41 in the trunnions 20 by virtue of a snap fit whereby relative rotation between the surface of the arms 41 and the trunnions 20 can be easily effected.

Referring now to FIG. 3, the cam rod assembly can be seen in greater detail, with the right-hand portion of the assembly 18 having a diagonal slot 17 formed therein with end limits 17' and 17". On either side of the diagonal slot 17, there are surfaces 17a and 17b which bear against the projection 42 during operation of moving the mirror between high and low positions of reflectivity.

Referring to the left-hand side of the assembly 18, a passage 15 can be seen formed therein in the partial section view. The passage 15 along with reduced passage area 15a has been provided to accommodate driving elements for the cam rod assembly and the motor 14. One convenient means of driving the cam rod assembly 18 is by use of a combination worm gear and drive nut which can be inserted in the passageway 15. Thus, the passageway 15 can have a generally square cross section as shown in the end view of FIG. 3a while the reduced portion of the passageway 15a can have a generally circular cross section for receipt of the worm gear after it passes through a drive nut.

The entire assembly as described above is shown in FIG. 4, wherein a drive nut 13 has been provided in passageway 15 along with compression springs 4 fixed on either side thereof to provide damped travel of the cam rod assembly back and forth. This damping effect provides smooth and easy travel of the mirror when being driven by the worm gear 16.

In operation, the worm gear 16 can be driven by the DC motor in a clockwise direction to threadedly engage the drive nut 13, thereby pulling the drive nut to the left in FIG. 4. The drive nut 13 bears against compression spring 11 and thence against the end cap 18' of the cam rod assembly 18. The cam rod 18 is driven to the left so that projection 42 is cammed alongside the slot sides 17a and 17b until it rests against slot end 17'.

This pivots the frame 12 and the trapezoidal mirror 11 to the position of reflectivity associated therewith. The springs 11 help prevent the nut 13 from fitting too tightly against end cap 18' and against the other end of the passage 15, when the nut 13 is driven toward them after the desired orientation is reached.

When the worm gear 16 is rotated by bi-directional DC motor 14 in the counterclockwise direction, the nut 13 is threadedly engaged to be moved to the right-hand side in FIG. 4 thereby bearing against compression spring 4 and thence to the shoulders of the passageway 15 of the cam rod assembly. In this mode of operation the assembly is thereby pushed to the right so that the projection 42 is cammed against sides 17a and 17b to drive the cam rod assembly and housing fixed thereto simultaneously to the position provided by the end 17" in slot 17.

It is important that in the present assembly, the motor control circuit provide current to actuate the worm gear 16 sufficient only to move the rod assembly between the two limiting positions 17' and 17" of slot 17. The time controlled nature of the drive reduces the time period that the motor is activated to be just beyond that necessary to attain the desired orientation without excessive use of electricity. Furthermore, the present invention provides smooth and relatively uninterrupted travel between the two positions by virtue of the damping provided by compression springs 4 so that uneven travel resulting from surfaces sticking to one another can be prevented from being translated into jerky transition between positions of high and low reflectivity.

Motor Control Circuit

Figure 5:
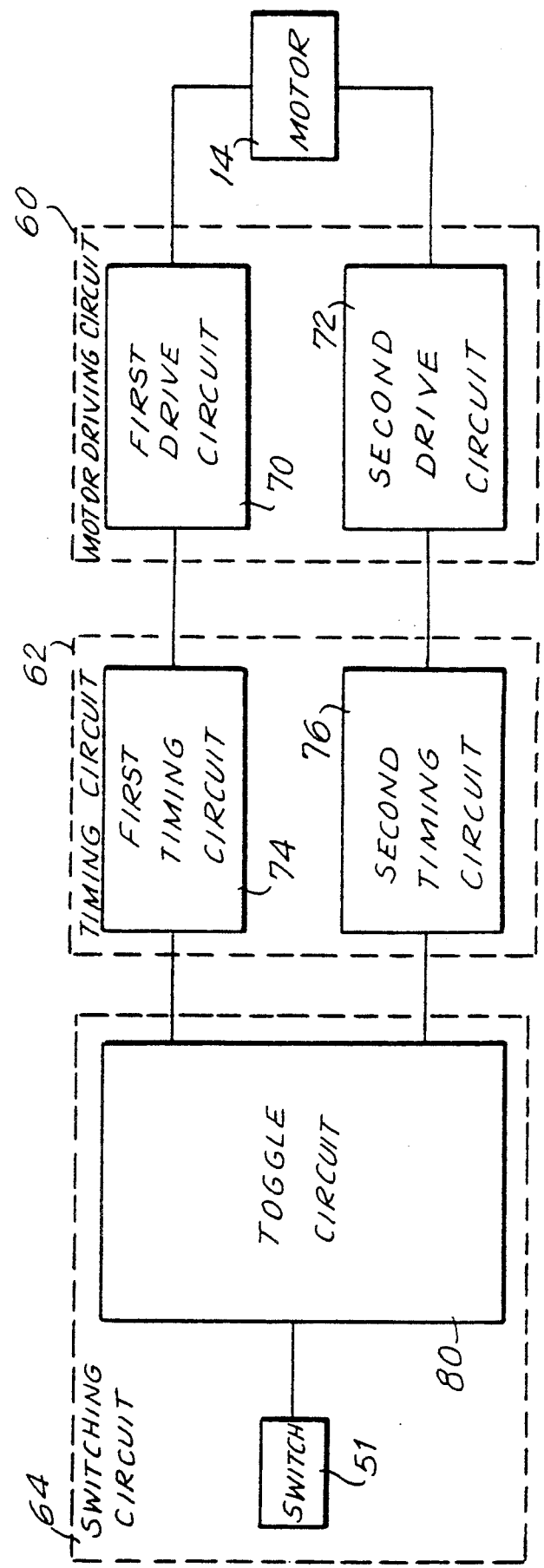
FIG. 5 is a block diagram of the motor control circuit of the present invention.

Referring to FIG. 5 of the drawings, it will be seen that the motor control circuit of the rear view mirror assembly constructed in accordance with the present invention includes, in its most basic form, a motor driving circuit 60, a timing circuit 62 and an operator actuatable switching circuit 64.

The motor driving circuit 60 is coupled to the reversible DC motor 14, which motor is operatively linked to the prismatic mirror 11 of the mirror assembly to drive the mirror between a low reflectivity disposition and a high reflectivity disposition. The motor driving circuit selectively supplies a current bi-directionally to the motor 14 to drive the motor.

The timing circuit 62 is used for controlling the time during which current is supplied to the motor 14. The timing circuit 62 provides an output signal, and the motor driving circuit 60 is responsive to the output signal of the timing circuit, and thus supplies current to the motor only for a predetermined duration determined by the timing circuit 62.

The switching circuit 64 of the motor control circuit is controllable by the vehicle operator. The switching circuit 64 is used for controlling the direction current is supplied to the motor 14. The switching circuit 64 provides an output signal, and the timing circuit 62 generates its output signal in response to the output signal of the switching circuit 64.

In a more preferred form of the motor control circuit of the present invention, the motor driving circuit 60 includes a first drive circuit 70 and a second drive circuit 72. Each of the first and second drive circuits 70, 72 are coupled to the motor 14. The first and second drive circuits 70, 72 are operable in a first state, where current is supplied to the motor 14 in a first direction so that the motor shaft rotates in a forward direction; in a second state, where current is supplied to the motor 14 in a second direction which is opposite to the first direction, so that the motor 14 rotates in a reverse direction; and in a third state, where no current is supplied to the motor 14 so that the motor does not turn and the mirror 11 remains in a particular disposition.

Similarly, in its preferred form, the timing circuit 62 of the motor control circuit includes a first timing circuit 74 and a second timing circuit 76. The first and second timing circuits 74, 76 are coupled to the first and second drive circuits 70, 72, respectively, and to the operator actuatable switching circuit 64. Each of the first and second timing circuits 74, 76 selectively provide a pulsed output signal of a predetermined duration in response to the output signal of the operator actuatable switching circuit 64. The first and second drive circuits 70, 72 are responsive to the pulsed output signals of the first and second timing circuits 74, 76, respectively, to supply or not supply current to the motor 14.

The operator actuatable switching circuit 64 preferably includes a switch S1, disposed on the outside of the mirror assembly housing 12 for the vehicle operator to actuate, and a toggle circuit 80 coupled to the switch S1. The switch S1 is a momentary contact switch, and the toggle circuit 80 provides a logic output which changes logic states in response to actuation of the momentary contact switch.

Figure 6:
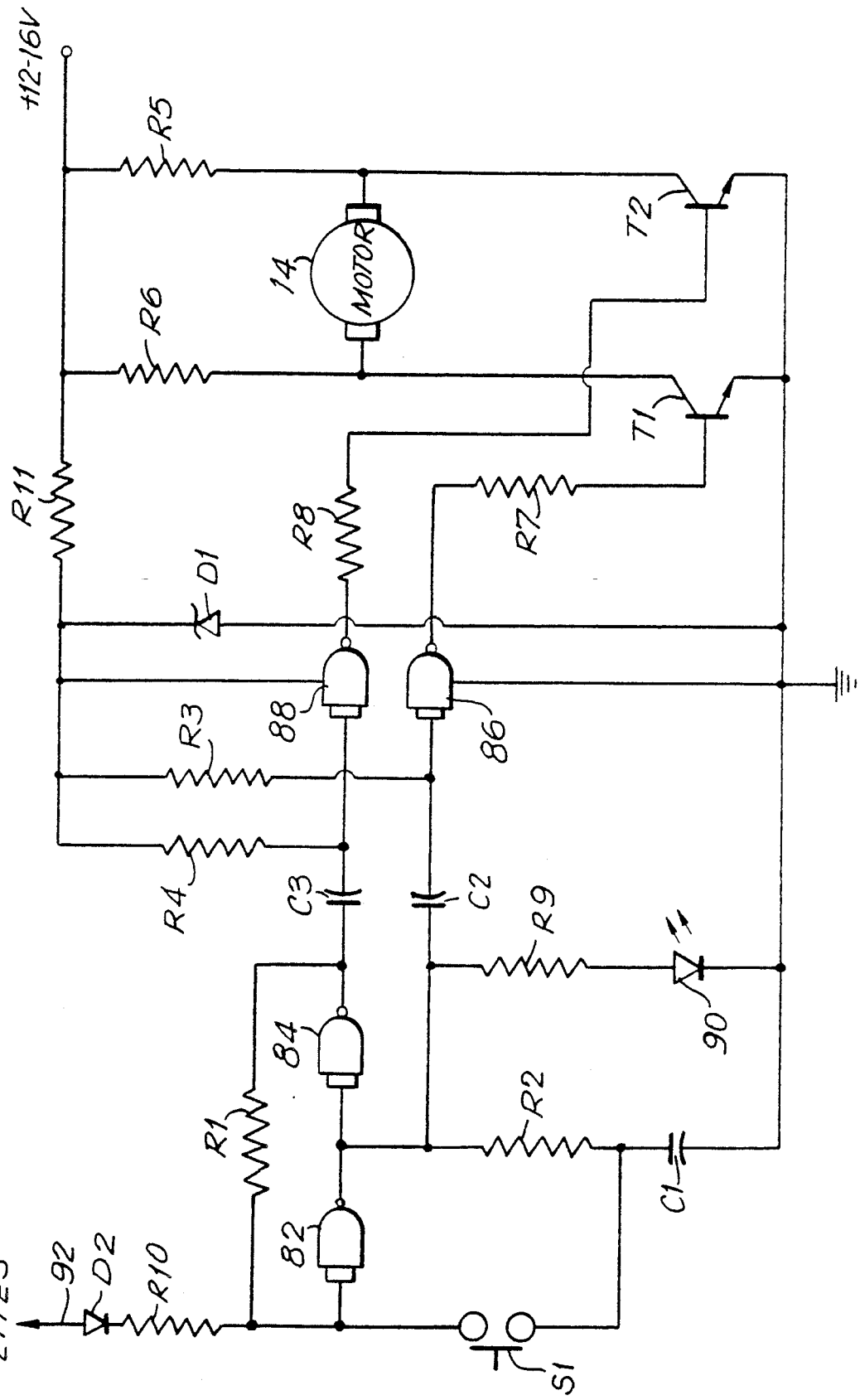
FIG. 6 is a schematic diagram of the motor control circuit illustrated by FIG. 5.

Referring now to FIG. 6 of the drawings which schematically illustrates a preferred form of the motor control circuit, it will be seen that the momentary contact switch S1 is basically a push-button switch, and the toggle circuit 80 includes first and second NAND gates 82, 84, each of which has its inputs connected together so that each gate acts as an inverter. The output of the first gate 82 is coupled to the input of the second gate 84, and the output of the second gate 84 is coupled back to the input of the first gate 82 through a feedback resistor R1. Furthermore, the output of the first gate 82 is connected to a storage device, such as a capacitor C1, through a resistor R2, and the capacitor C1 is selectively coupled to the input of the first gate 82 through the push-button switch S1.

As its name implies, the toggle circuit 80 provides alternate logic states at the outputs of the first and second gates 82, 84, which outputs change state every time the push-button switch S1 is actuated.

If, for example, the outputs of the first and second gates 82, 84 are respectively at a high and low logic level, the capacitor C1 will charge through the resistor R2 to a voltage comparable to a high logic level. When the push-button switch S1 is actuated, the charge on the capacitor C1 is transferred through the switch to the input of the first gate 82, causing the first gate to change states (in the example, the output of the first gate 82 goes to a low logic level). Because the two gates are coupled together, the first gate 82 causes the output of the second gate 84 to change states (that is, to a high logic level). The high logic level of the second gate's output is fed back to the input of the first gate 82 through the resistor R1, which logic level is the same as the logic level initially impressed on the first gate 82 by the capacitor C1.

The capacitor C1 will now discharge to a low logic level, which logic level will be impressed on the input of the first gate 82, causing the output of the first and second gates 82, 84 to change states, when the push-button switch S1 is actuated a second time.

Thus, the switching circuit 64 acts as a low speed debouncing circuit which provides logic output signals that are in alternate states and that change states every time the push-button switch S1 is actuated.

As mentioned previously, the first and second timing circuits 74, 76 are connected to the toggle circuit 80 and, more specifically, to the outputs of the first and second logic gates 82, 84, respectively. Each of the first and second timing circuits 74, 76 preferably includes a timing capacitor C2, C3 and a timing resistor R3, R4, which are connected together, and a logic NAND gate whose inputs are connected together so that each NAND gate acts as an inverter. The inputs of the NAND gates 86, 88 are connected to their respective timing resistors R3, R4 and capacitor C2, C3. The timing capacitors C2, C3 are connected to the outputs of the first and second gates 82, 84 of the toggle circuit 80.

The capacitors C2, C3 of the timing circuits 74, 76 will charge through their respective timing resistors R3, R4 to either a high logic level or a low logic level, depending upon the state of the first and second gates 82, 84 of the toggle circuit. If, for example, the outputs of the first and second gates 82, 84 are respectively high and low, the timing capacitors C2, C3 of the first and second timing circuits 74, 76 will charge to a low and high logic level, respectively. However, under steady state conditions, the inputs of the NAND gates 86, 88 of the first and second timing circuits will be pulled up to a high logic level through their respective timing resistors R3, R4 so that the outputs of the NAND gates 86, 88 will be at a low logic level.

When the toggle circuit 80 changes states, the inputs of the NAND gates 86, 88 of the timing circuits 74, 76 will see the pre-existing charge on the timing capacitors C2, C3 coupled with the new logic level of the first and second gates 82, 84. Thus, in the example given above, the input of the first timing circuit's gate 86 will see the low logic level charge of the timing capacitor C2 in combination with the low output state of the first gate 82 of the toggle circuit 80 and, accordingly, the output of the gate 86 will change from a low logic level to a high logic level.

In an analogous fashion, the gate 88 of the second timing circuit 76 will see the high logic level charge on the capacitor C3 coupled with the new high logic level on the output of the second gate 84. Because the input of the NAND gate 88 was already at a high logic level (under steady state conditions), its output will remain at a low logic level.

The timing capacitors C2, C3 will now charge to new logic levels. The timing capacitor C2 of the first timing circuit 74 will charge to a high logic level, and the timing capacitor C3 of the second timing circuit 76 will discharge to a low logic level. When the timing capacitor C2 of the first timing circuit 74 has charged sufficiently, the input of the NAND gate 86 will be pulled up to a high logic level, causing its output to go low. The output of the NAND gate 88 of the second timing circuit 76 will remain low, as its input remains at a high logic level.

Thus, in the example given above, a pulsed output signal is provided on the output of the NAND gate 86 of the first timing circuit 74. The NAND gate's output provides a high going pulse having a pulse width which is proportional to the product of the resistance of the timing resistor R3 and the capacitance of the timing capacitor C2.

When the push-button switch S1 is actuated a second time, causing the outputs of the toggle circuit 80 to alternate in state, the output of the NAND gate 88 of the second timing circuit 76 will now provide a high going pulsed signal whose pulse width is determined by the resistance and capacitance of the corresponding timing resistor R4 and capacitor C3, while the output of the NAND gate 86 of the first timing circuit 74 will remain low. As will be seen, the DC motor 14 of the motor control circuit will only be driven substantially for the duration of the high going pulse on the output signals of the NAND gates of the first and second timing circuits 74, 76.

As mentioned previously, the motor driving circuit includes first and second drive circuits 70, 72 which are coupled to the motor 14. As will be seen, the first and second drive circuits 70, 72 respectively operate as a source of and a sink for current supplied to the motor 14 when the circuits are in one state, and respectively operate as a sink for and a source of current when the circuits are in a second state.

Each of the drive circuits 72, 74 includes a transistor T1, T2, which acts as a switch, coupled to the motor 14; a load resistor R5, R6 which is coupled to the transistor T1, T2 and to the motor 14; and a base resistor R7, R8 which is coupled to the base of the transistor T1, T2. The base resistors R7, R8 of the first and second drive circuits 70, 72 are connected to the outputs of the NAND gates 86, 88 of the first and second timing circuits, respectively.

The transistors T1, T2 of the first and second drive circuits 70, 72 are driven on and off in response to the pulsed output signals of their respective timing circuits 74, 76 to which they are connected so that they either conduct current through the motor 14 or do not conduct current.

Under steady conditions, when the outputs of the NAND gates 86, 88 of the first and second timing circuits 74, 76 are at a low logic level, the transistors T1, T2 of the first and second drive circuits 70, 72 will be cut off so that they do not conduct current. In this state, neither transistor T1, T2 acts as a sink for motor current, and as a result, the motor 14 does not rotate.

If, for example, actuation of the push-button switch S1 causes a high going pulse at the output of the first timing circuit's NAND gate 86, the high going pulse is provided to the base of the transistor T1 of the first drive circuit through the base resistor R7. The transistor T1 will be turned on and will conduct current through the motor supplied by the load resistor R5. The logic output of the second timing circuit 76 remains low during the presence of the high going pulse on the first timing circuit's output; as a result, the transistor T2 of the second drive circuit 72 remains cut off so that it does not conduct current through the motor 14. Consequently, current flows through the motor in one direction so that the motor 14 will rotate in the forward direction.

The transistor T1 of the first drive circuit 70 will remain on only for the duration of the high going pulse on the first timing circuit's output. When the output of the first timing circuit 74 returns to a low, steady state level, the transistor T1 will be cut off and stop conducting current through the motor 14. The motor will, of course, stop rotating in the forward direction when no current flows through it.

If the push-button switch S1 is actuated a second time, a high going pulse is now provided by the second timing circuit 76 through the base resistor R8 to the transistor T2 of the second drive circuit 72. The transistor T2 will conduct current through the motor 14 supplied by load resistor R6, while during this time the transistor T1 of the first drive circuit 70 will remain non-conductive. Accordingly, current is now supplied through the motor 14 in an opposite direction, causing the motor to rotate in a reverse direction.

The transistor T2 of the second drive circuit 72 will conduct for the duration of the high going pulse of the second timing circuit 76. Both transistors T1, T2 of the first and second drive circuits are cut off and will not conduct current through the motor 14 when the outputs of the first and second timing circuits 74, 76 return to their low, steady state logic level.

Thus, it can be seen that every time the push-button switch S1 is actuated by the vehicle operator, the motor 14 controlling the disposition of the mirror 11 will be driven in either the forward direction or the reverse direction for a time determined by the values of the resistors R3, R4 and capacitors C2, C3 of the first and second timing circuits 74, 76. The values of these components are selected to ensure that the motor 14 is driven sufficiently in each direction so that the mirror 11 is placed in either a low reflectivity disposition or a high reflectivity disposition. Thus, the motor control circuit of the present invention eliminates the need for limit switches employed in conventional rear view mirror assemblies to control the current through the mirror positioning motor.

The motor control circuit may further include an indicator 90 which is mounted on the mirror housing 12 and which is visible to the vehicle operator to indicate when the mirror is in the low reflectivity mode. Preferably, the indicator 90 is a light emitting diode which is coupled through a current limiting resistor R9 to the output of the first gate 82 of the toggle circuit 80. Thus, whenever the output of the first gate 82 goes to a high logic level, the light emitting diode 90 will conduct to indicate that the mirror 11 is in the low reflectivity disposition.

It is also desirable for the mirror control circuit to automatically switch the mirror 11 to a high reflectivity disposition whenever the automobile is backing up. For this purpose, the input of the first gate 82 of the toggle circuit 80 is connected to the vehicle's hot lead 92 of the back lights through a resistor R10 and a diode D2, connected in series with resistor R10. When the vehicle operator puts the automobile transmission into reverse, the hot lead 92 to the backup lights will be energized, impressing a high logic level on the input of the first gate 82. If the mirror 11 is not already in the high reflectivity disposition, the mirror control circuit will energize the motor 14 to drive the mirror to that particular disposition.

One of the further advantages of the particular configuration of the motor drive circuit is that it helps brake the rotation of the motor shaft after the motor has been energized for the time determined by the timing circuit. This prevents the motor 14 from "coasting" after it has already placed the mirror 11 into either reflectivity disposition. The "braking" effect is caused by the connection of the load resistors R5, R6 to the motor 14. After the transistors T1, T2 of the first and second drive circuits 70, 72 become non-conductive, the motor 14 continues to turn slightly. The motor thus becomes a generator and provides a reverse voltage across the load resistors R5, R6. This reverse voltage causes reverse current to flow through the motor 14, stopping it in a relatively short period of time.

The motor control circuit further includes a power control circuit comprising a zener diode D1 coupled to a resistor R11. The zener diode D1 helps protect the circuit from surges in the line voltage, or from connecting the motor control circuit inadvertently to a voltage source of incorrect polarity.

The motor control circuit of the present invention provides a bi-directional current to the DC motor 14 which drives the mirror 11 between low reflectivity and high reflectivity dispositions. The motor is driven in the forward or reverse directions for substantially the time determined by the values of the resistors R3, R4 and capacitors C2, C3 of the first and second timing circuits.

The motor control circuit of the present invention eliminates the need for limit switches found in conventional rear view mirror assemblies. The circuit has relatively few components, which increases its reliability and enhances its ability to be easily fitted into the housing of the rear view mirror assembly.

Automatic Circuit

Figure 13:
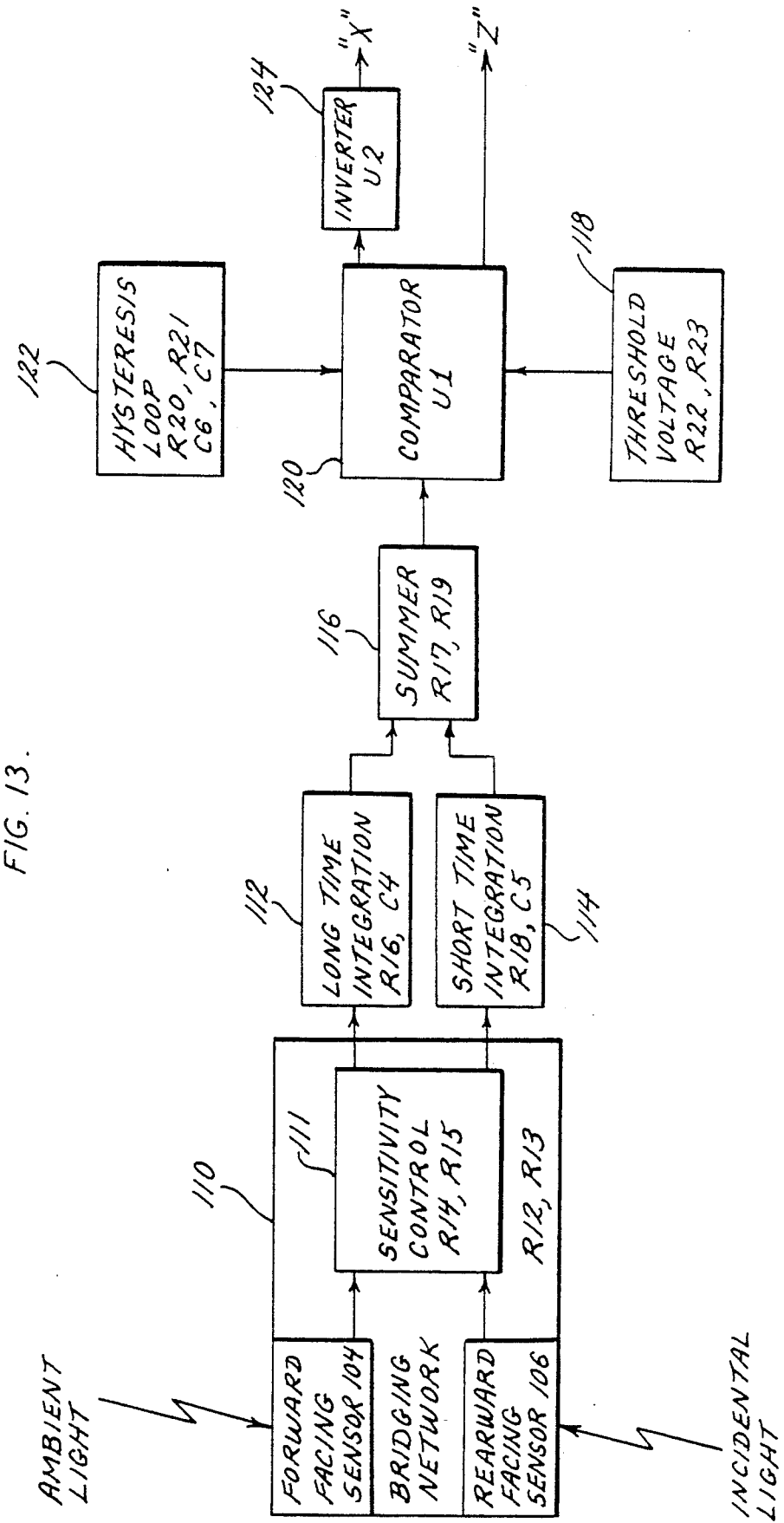
FIG. 13 is a schematic block diagram of the part of a circuit that can be used with the circuit of FIGS. 5 and 6 to automatically control the position of the mirror.
Figure 14:
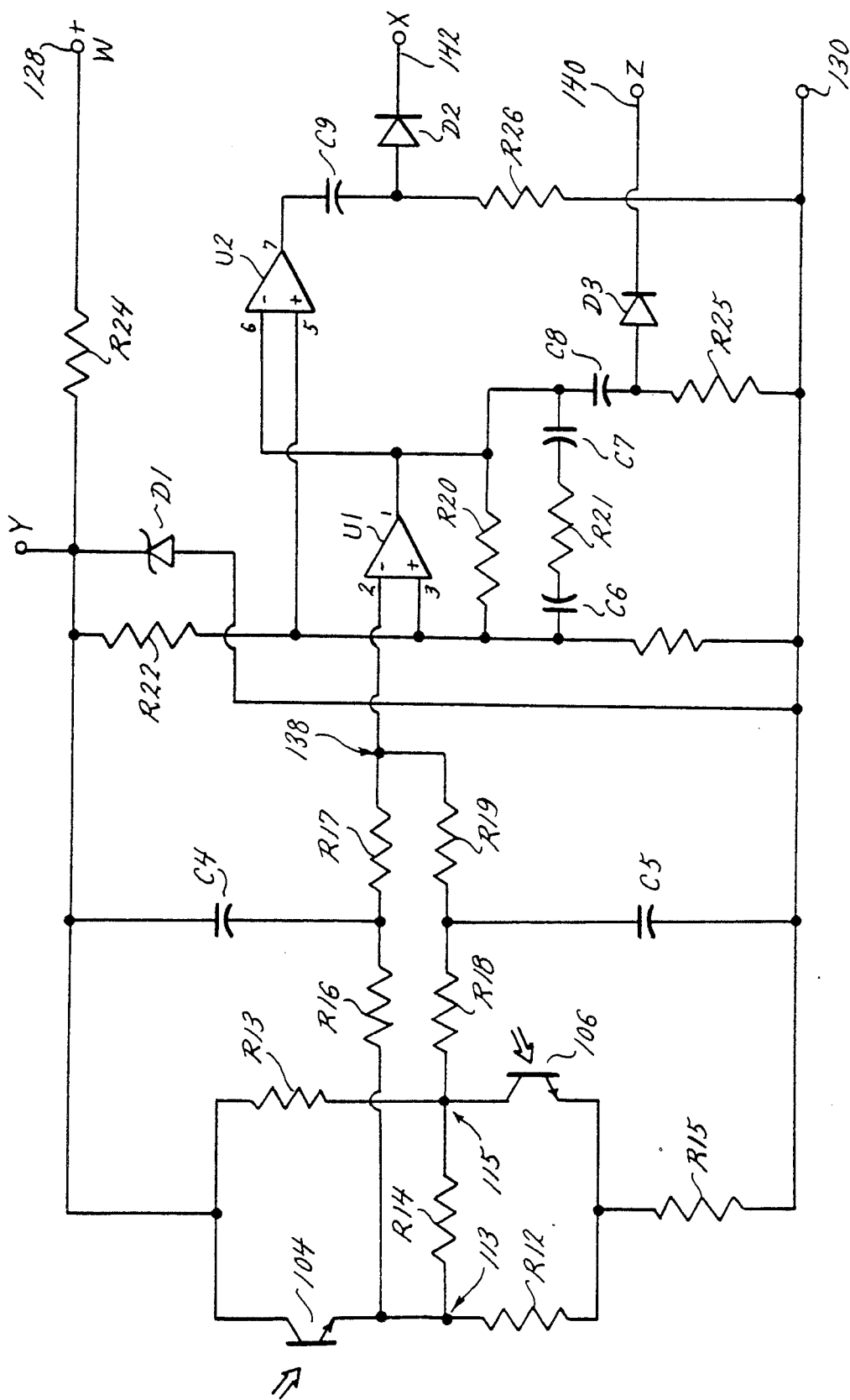
FIG. 14 is a detailed motor control circuit diagram which includes components of the FIG. 13 block diagram.

FIG. 13 illustrates, in schematic block diagram form, the motor control circuit which provides for automatic adjustment of the mirror responsive to the ambient light conditions and incident light from another vehicle. FIG. 14 shows the control circuitry in detail.

Figure 15:
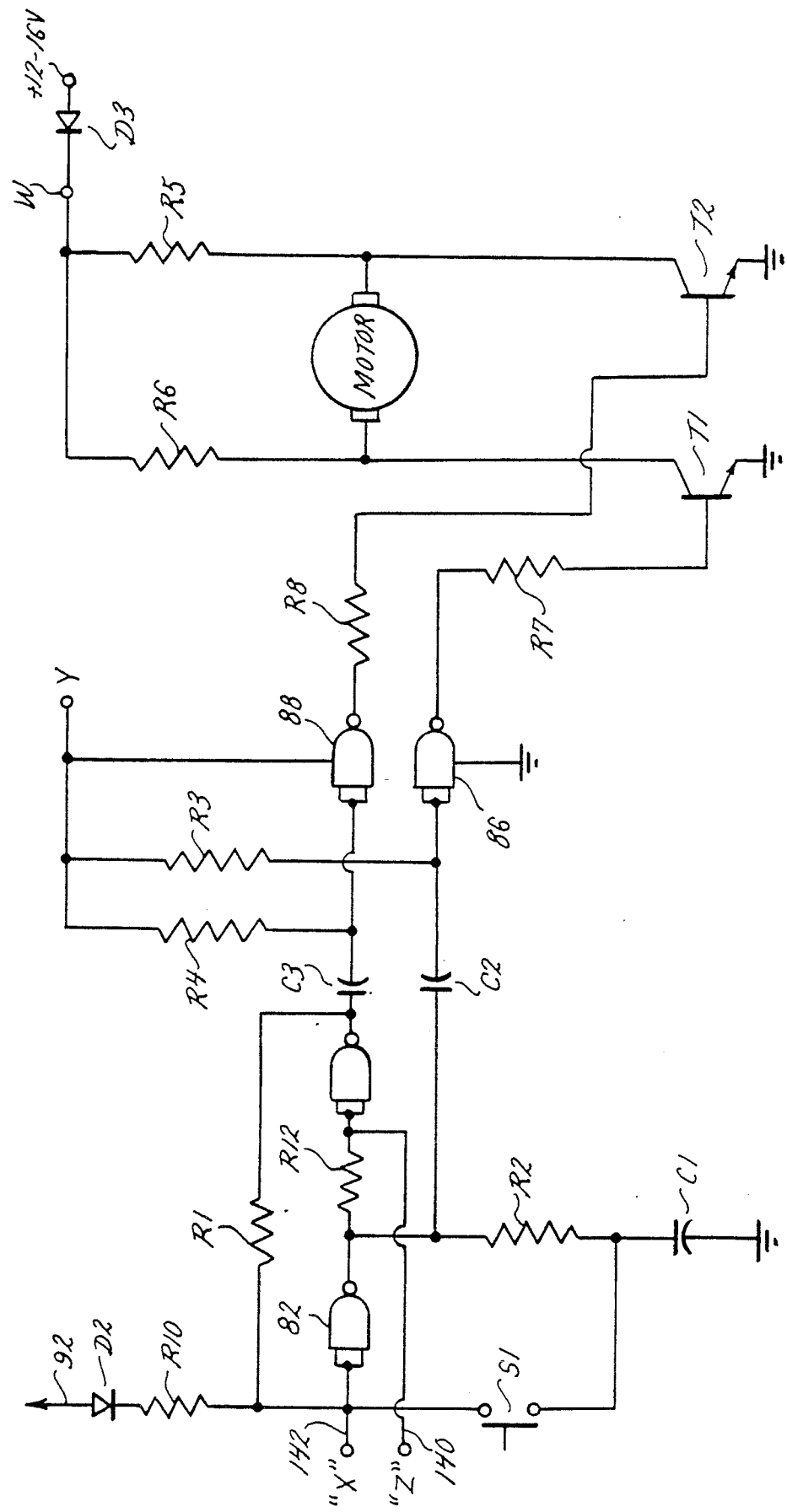
FIG. 15 is a diagram of a modification of the motor control circuit of FIG. 6, for use with interfacing with the circuit of FIG. 14.

Before discussing the automatic circuit of FIG. 14 in detail, it is noted that preferably for interfacing with that automatic circuit, the semi-automatic circuit of FIG. 6 is modified to be as illustrated in FIG. 15 to work in conjunction with the circuit of FIG. 14. The circuits of FIGS. 14 and 15 can automatically drive the rearview mirror between high and low reflectivity positions in response to changes in the ambient and incident light levels.

The difference between the FIG. 15 circuit and the FIG. 6 circuit are as follows: The LED 90 and the accompanying resistor R9 can be removed from FIG. 6. As shown in FIG. 15, a resistor R12 can be electrically connected between inverter 82 and inverter 84. The resistor R12 isolates input Z from the output of inverter 82.

FIG. 15 shows resistor R11 removed, and shows terminals receiving inputs Y and W from FIG. 14. The terminal for receiving input Y is electrically connected to resistors R3 and R4 and supplies power to inverters 82, 84, 86 and 88. The terminal for receiving input W is electrically connected to resistors R5 and R6 and supplies power to the motor and transistors T1 and T2.

The zener diode D1 of FIG. 6 is not shown in FIG. 15, because the input Y is connected to the zener diode D1 of FIG. 14 and protects the semi-automatic circuit from voltage spikes and overvoltage. A diode D3 is shown connected between terminal W and the battery.

Referring now to FIGS. 13 and 14, a bridging network 110 includes a forward facing sensor 104, a rearward facing sensor 106, sensitivity control 111 in the form of resistors R14 and R15, and resistors R12 and R13. Bridging network 110 further comprises output nodes 113 and 115. The forward facing sensor 104 is provided in the form of a phototransistor which faces forward of the vehicle and senses incoming ambient light. The rearward facing sensor 106 is also provided in the form of a phototransistor which faces rearwardly of the vehicle and senses incoming incident light therefrom, such as headlights from a following vehicle.

The circuit has means for maintaining the mirror in the high reflectivity position when the forward facing sensor 104 detects an ambient light level above a predetermined value, such as a value for normal daylight.

The resistance of the sensors 104 and 106 changes according to the level of detected light allowing for generation of electrical signals indicative of forward and rearward light levels. The sensitivity control 111, comprised of resistors R14 and R15, controls the sensitivity of the bridge, eliminating the need for an external sensitivity adjustment control.

The forward sensor circuitry includes a long time integration circuit 112, comprising a resistor R16 and a capacitor C4. The long time integration circuit 112 prevents an undesirable change in the mirror position during a sudden change in the ambient light level, a situation which occurs when a vehicle enters a tunnel during daylight hours. The rearward sensory circuitry includes a short time integration circuit 114, comprising a resistor R18 and a capacitor C5. The short time integration circuit 114 is much faster in response than the long time integration circuit 112, allowing for quick changeover from a high reflectivity state to a low reflectivity state when headlights from a trailing car, or the like, are incident upon the vehicle's rearview mirror.

A summer 116, comprised of resistors R17 and R19, provides a means for adding the electronic signals from the forward sensor circuitry and the rearward sensor circuitry.

A threshold circuit 118 includes resistors R22 and R23 and provides a reference signal for comparison to the combined output of the summer. A comparator circuit 120 includes a comparator U1 which performs said comparison of the threshold voltage to output of the summer. The comparator circuit 120 further includes a time dependent hysteresis loop 122 comprising resistors R20, R21 and capacitors C6, C7. Additionally, resistors R22 and R23 of the threshold circuit 118 provide the driving point impedance at pin 3 of comparator U1 for the hysterisis loop 122. When the rearview mirror switches from the high to the low reflectivity positions, the hysteresis loop 122 prevents the mirror from switching back to the high reflectivity position for approximately ten seconds. This effect prevents continuous switching of mirror positioning during low ambient lighting conditions where incident light upon the mirror is sporadic within a short time interval.

The motor control circuit further includes an inverter 124 comprised of comparator U2 for inverting the output of comparator U1, the outputs of comparators U1 and U2 serving as input signals for the semi-automatic circuit of FIG. 6.

Referring to FIG. 14, the circuitry is energized by a positive voltage at node 128, the voltage typically being supplied from the vehicle's electrical system. Terminal 130 is connected to the system ground.

The resistor R24 limits current from overvoltage and from reversed polarity applied to the terminals 128 and 130. The zener diode D1 helps protect the circuit from overvoltage and/or transient spikes. The diode has an output Y for connection to the modified semi-automatic circuit at its Y terminal, for protecting circuit components of said semi-automatic circuit. Diodes D2 and D3 are connected at the outputs of the motor control circuit and serve to isolate the motor control circuit from the semiautomatic circuit so that manual switchover can be achieved as described in the discussion of the FIG. 6 circuitry. Differentiating pulse forming networks comprising capacitor C8 and resistor R25, and capacitor C9 and resistor R26, allow positive-going pulses to be transferred by way of diodes D2 and D3 to gates 82 and 84, respectively. Capacitors C8 and C9 block D.C. voltage and prevent diodes D2 and D3 from becoming forward biased, thus allowing gates 82 and 84 to change states in response to the manual switch at will.

When the circuit is powered up, the voltage at node 138 is much higher than the voltage on pin 3 of comparator U1 which results in a low "0" voltage level at node 140 and a high (power supply) voltage at node 142. Under these conditions the circuit will drive the mirror to a high reflectivity position. After approximately one minute, the voltage at node 138 settles at a level determined by the summing of the voltages at nodes 113 and 115. If the summed voltage level at node 138 is above the threshold voltage at pin 3 of comparator U1, the output of the comparator remains in the same state. If the summed voltage is below the threshold voltage, the output of the comparator U1 changes states causing a high voltage level at node 140 and a low voltage level at node 142, thus driving the mirror to the low reflectivity position.

The values of the circuit components of FIG. 14 are set such that during daylight hours, switchovers from a high to a low reflectivity position are prevented. During daylight conditions the current flow in resistors R12 and R13 reaches a maximum and thus a maximum in resistor R15 which raises the sum at nodes 113 and 115 above the voltage at pin 3 of comparator U1. Thus, during daylight conditions, the signal from the rearward-facing sensor 106 does not affect the reflectivity position of the rear view mirror. Resistors R16, R17, R18 and R19 should be set to values such that when daylight ambient conditions exist upon forward sensor 104, a voltage should be created at pin 2 of U1 that is greater than that at pin 3 at U1, so that changeover from high reflectivity to low reflectivity is prevented.

The automatic drive circuit of FIG. 14 should be interfaced to the motor control circuit of FIGS. 5 and 6, as the same were discussed as modified in the beginning of this discussion of the automatic circuit, so that the mirror can automatically be adjusted according to detected lighting conditions. Node 140 (terminal Z) and node 142 (terminal X) of FIG. 14 are electrically connected to the node defined by the input to gate 84 and to the node defined by the input gate 82, respectively, as shown in FIG. 6.

For the circuitry of FIG. 13, the circuit elements have the following values:
104—Photo Darlington Transistor L14R1
106—Photo Darlington Transistor L14R1
R12—220 K ohm
R13—220 K ohm
R14—1 M ohm
R15—10 K ohm
R16—470 K ohm
R17—1 M ohm
R18—470 K ohm
R19—1 M ohm
R20—10 M ohm
R21—1 M ohm
R22—330 K ohm
R23—390 K ohm
R24—4.7 K ohm
R25—100 K ohm R26—100 K ohm
C4—100 MFD
C5—3.3 MFD
C6—22 MFD
C7—22 MFD
C8—1 MFD
C9—1 MFD
(132) D1—Zener Diode IN4740 12V
(134) D2—Diode IN914
(136) D3—Diode IN914
U1—One-half 1458 Integrated Circuit
U2—One-half 1458 Integrated Circuit For interfacing the modified circuitry of FIG. 15 with the circuitry of FIG. 14, the elements of FIG. 15 have the following values:
R1—15 K ohm
R2—1 M ohm
R3—1 M ohm
R4—1 M ohm
R5—10 ohm 2W
R6—10 ohm 2W
R7—4.7 K ohm
R8—4.7 K ohm
R9—4.7 K ohm
R10—4.7 K ohm
R11—160 ohm ½W
R12—15 K ohm
C1—0.47 MFD
C2—0.68 MFD
C3—0.68 MFD
T1—TIP 110
T2—TIP 110
S1—manual switch
82, 84, 86, 88—4011B
90—LED T-1¾
D1—IN914
D2—IN914
D3—IN4004

The Switch

Figure 7:
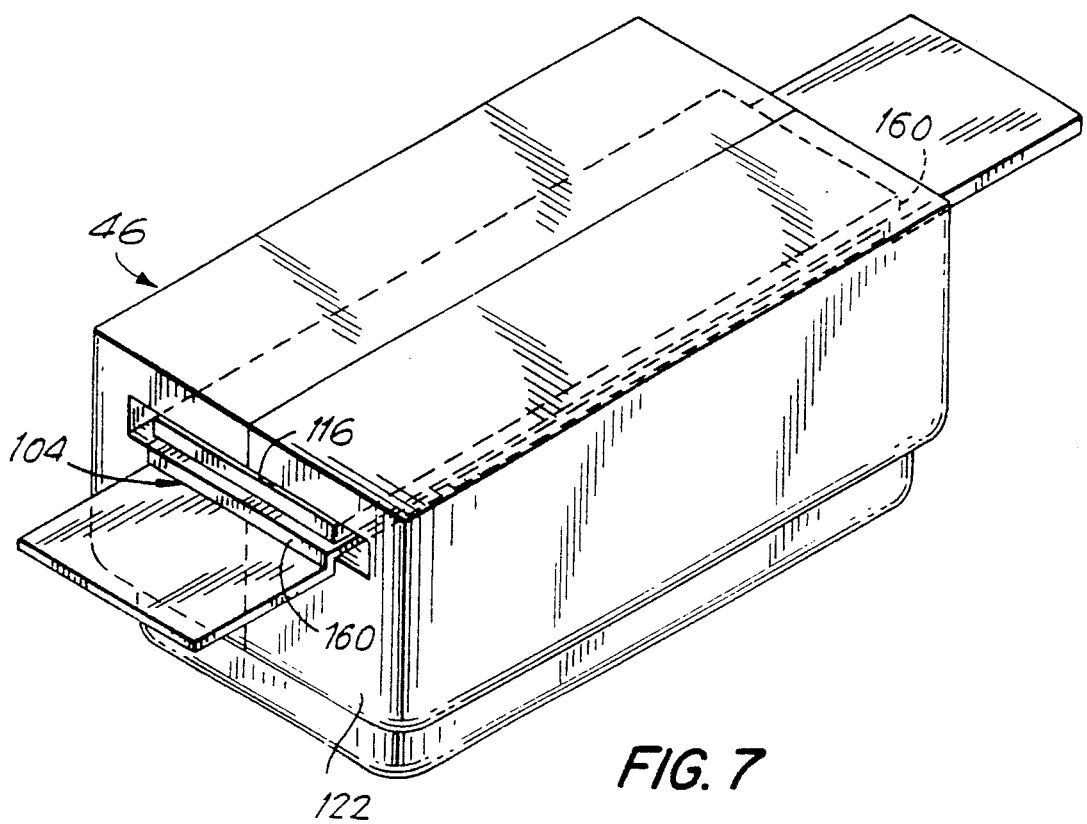
FIG. 7 is an isometric view of a push-button switch, which is actuated by the vehicle operator to change the reflectivity of the mirror, formed in accordance with the present invention.
Figure 8:
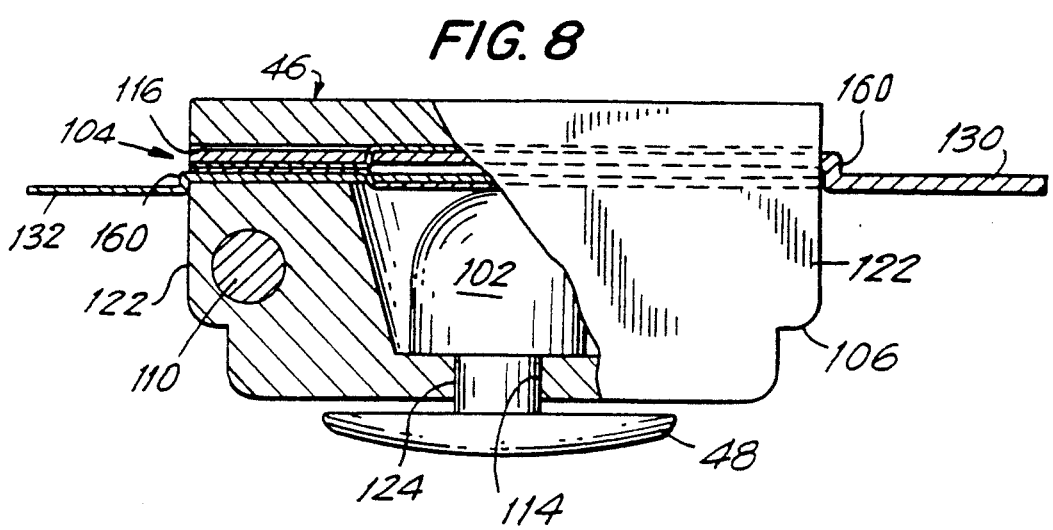
FIG. 8 is a side view of the push-button switch with its housing partially broken away.
Figure 9:
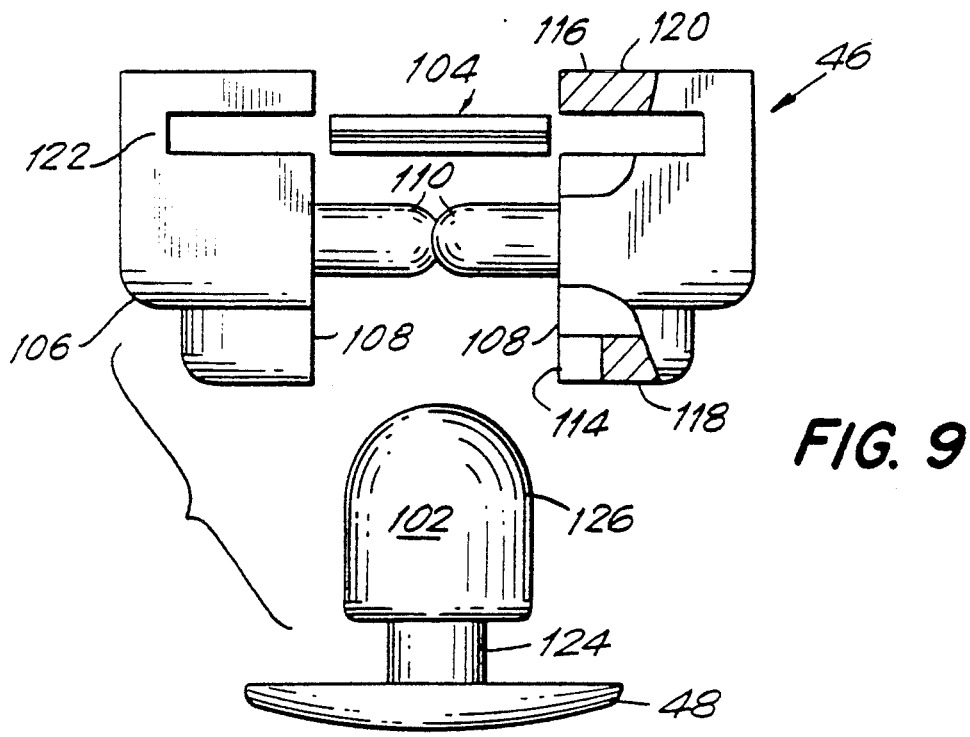
FIG. 9 is an exploded view of the push-button switch shown in FIGS. 7 and 8.

Referring initially to FIGS. 7-9 of the drawings, it will be seen that the push-button switch S1 constructed in accordance with the present invention basically includes a housing 46, an actuator 102, and a contact assembly 104.

The housing 46 is preferably formed by injection molding although other techniques may be used. Advantageously, the housing is formed from two substantially identical half housing members 106 which are joined together by press fitting or the like. Thus, only one mold is needed in the injection molding process of forming the half housing members 106.

Each half housing member 106 has a mating surface 108 which engages the mating surface of the other when the two are joined together. A pin 110 extends outwardly of the mating surface 108 of each half housing member, and a hole 112 is also formed in each mating surface 108. The pin 110 of each half housing member is received by the hole 112 formed in the other half housing member so that the two can be press fitted together to define the housing 100 of the push-button switch S1. The pin and hole arrangement allows the half housing members 106 to be joined together without gluing or other fasteners, although such may be used if desired.

An opening 114 and a slot 116 are formed in the housing to receive the actuator 102 and the contact assembly 104, respectively. The opening 114 is formed in the bottom side 118 of the housing, and the slot 116 is formed near the top side 120 of the housing and extends through the housing's opposite lateral sides 122. The slot 116 overlies the opening 114 so that the contact assembly 104 will be in axial alignment with the actuator 102 when the two are assembled in the housing.

Preferably, as shown in FIG. 9, each half housing member 106 is formed with half the slot 116 and half the opening 114 so that when the housing members are joined together, they define the full slot and full opening of the housing. As will be seen, forming each housing member 106 with slot and opening portions will facilitate assembly of the push-button switch S1.

The actuator 102 is the component of the pushbutton switch which the vehicle operator presses to effect an electrical path through the switch. The actuator 102 includes a cylindrical stem portion 124 which is received by the housing opening 114 and which includes two opposite ends. On one end of the stem portion 124 is mounted a tip portion 126 which is disposed in the interior of the housing 100 when the switch is assembled. The tip portion 126 is a rather bulbous formation which is adapted to engage the contact assembly 104.

A head portion 48 is mounted on the other end of the stem portion 124. The head portion 48 resembles an oversized circular button, and is disposed exteriorly of the housing 100. The user presses the head portion 48 to actuate the switch S1.

The diameter of the housing opening 144 is less than those of the tip portion 126 and the head portion 48 of the actuator so that the actuator 102 will be retained in the housing opening when the push-button switch is assembled The housing 100 and actuator 102 may each be formed of a plastic material, which lends itself to fabrication by molding, although other materials may suitably be used.

Figure 10:
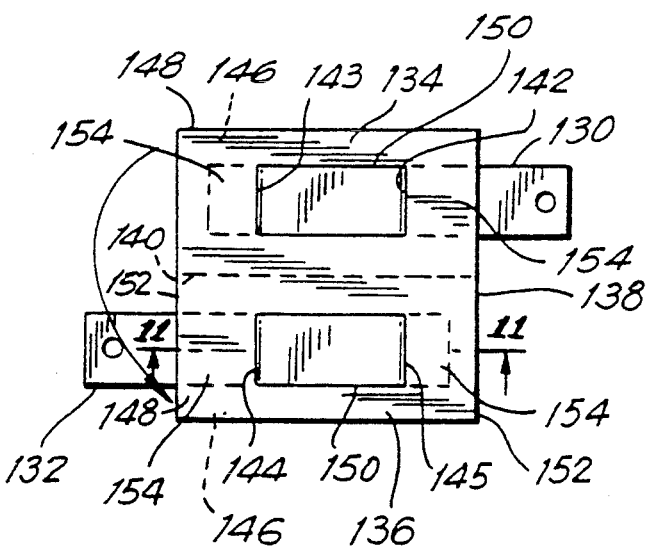
FIG. 10 is a plan view of a contact assembly, partially assembled, used in the push-button switch of the rear view mirror assembly.
Figure 11:
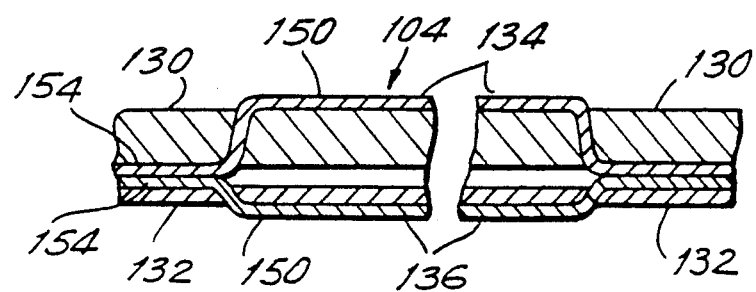
FIG. 11 is an enlarged, detailed side view of the contact assembly used in the push-button switch.

As shown in FIGS. 10 and 11 of the drawings, the contact assembly 104 of the push-button switch basically includes first and second electrically conductive contact members 130, 132, and first and second insulating members 134, 136. The first and second insulating members 134, 136 may be formed from a single sheet of insulating material 138 that is folded in half from one side of the sheet to the other opposite side. Thus, the fold line 140 (shown as a dashed line in FIG. 10) defines the juncture between the first and second insulating members 134, 136. Of course, the first and second insulating members may be separate from each other and formed from their own sheet of insulating material.

A pair of parallel, spaced-apart slots 142-145 are formed through the thickness of each of the first and second insulating members 134, 136. Preferably two slots are provided in each member, although it is envisioned to be within the scope of this invention to have one or more slots formed in each member.

The first and second contact members 130, 132 are inserted through the slots of the first and second insulating members 134, 136, respectively, so that each contact member is disposed in an alternating underlying and overlying relationship with its respective member.

As shown in FIG. 10, the first contact member 130 is inserted through the right-hand slot 142 of the first insulating member 134 from the rear side 146 of the insulating member, passes across the front side 148 of the insulating member and is inserted through the left-hand slot 143 from the front side 148 of the insulating member 134. Similarly, the second contact member 132 is inserted through the left-hand slot 144 of the second insulating member 136 from the rear side 146 of the insulating member, passes across the front side 148 of the insulating member 136, and is inserted through the right-hand slot 145 of the insulating member from the front side of the member 136.

The slots 142–145 of each insulating member 134, 136 thus define a central portion 150 between them over which the contact members 130, 132 are exposed on the front side 148 of the insulating member and define with a respective proximate lateral edge 152 of the member a pair of side portions 154 over which the contact members are not exposed on the front side 148 but are exposed on the rear side 146.

Once assembled with the contact members 130, 132 inserted properly in the slots, the sheet of insulating material 138 is folded at the fold line 140 so that the first contact member 130 and first insulating member 134 are disposed in overlying relationship with the second contact member 132 and the second insulating member 136. When disposed in this manner, a portion of the first contact member 130 situated at the central portion 150 of the first insulating member 134 faces a portion of the second contact member 132 situated at the central portion 150 of the second insulating member 136, and a portion of the first insulating member 134 (i.e., the side portions 154 on the first insulating member's front side 148) faces a portion of the second insulating member 136 (i.e., the side portions 154 on the second insulating member's front side 148).

As can be seen from FIG. 11, when the contact assembly 104 is assembled as described above, with the facing portions of the first and second insulating members 134, 136 in contact with one another, the facing portions of the first and second contact members 130, 132 are maintained in a spaced-apart relationship a distance equal to the combined thicknesses of the first and second insulating members.

The contact assembly 104 is mounted in the housing 100 with the central portions 150 of the insulating members in axial alignment with the actuator 102. When a force is exerted on the head portion 48 of the actuator, the tip portion 126 will engage the second insulating member 136 at its central portion 150 and force the facing portion of the second contact member 132 to engage the facing portion of the first contact member 130, thus completing an electrical path through the switch. When pressure on the actuator 102 is released, the second contact member 132 will return to its normal disposition out of engagement with the first contact member 130.

In a preferred form of the invention, the first contact member 130 is made relatively thicker than the second contact member 132 and is substantially rigid. The second contact member 132 is made from a much thinner material than the first contact member 130 so as to provide the second contact member with some resiliency. For example, the second contact member 132 may be formed from a spring tempered brass having a thickness of about 0.008 inches, and the first contact member 130 may be formed from quarter tempered brass having a thickness of about 0.031 inches. Brass is preferred because of its springiness; however, other electrically conductive materials may be used to form the first and second contact members.

The first and second insulating members 134, 136 are preferably formed from the same sheet of insulating material, such as Mylar (TM). The thickness of each insulating member is preferably 0.005 inches. Thus, when the contact assembly is formed as shown in FIG. 11, with the facing portions of the first and second insulating members 134, 136 in contact with each other, the gap between the first and second contact members 130, 132 is twice the thickness of the insulating members, or 0.010 inches.

Mylar (TM) is chosen in the construction of the insulating members because of its dimensional stability and its heat resistance, and because it does not absorb water and is rather inexpensive. Of course, other materials having electrical insulating properties may be chosen to form the first and second insulating members 134, 136.

The push-button switch of the present invention is assembled by positioning the stem portion 124 of the actuator in a portion of the housing opening 114 formed in one of the half housing members 106, positioning the contact assembly 104 in the portion of the housing slot 116 also formed in one of the half housing members 106, and press fitting the two half housing members 106 together so that the contact assembly 104 and actuator 102 are captured respectively in the housing slot 116 and housing opening 114. Alternatively, the half housing members 106 and actuator 102 may be assembled together, followed by the insertion of the contact assembly 104 into the housing slot 116 from one lateral side of the housing 100. A portion of each contact member 130, 132 preferably extends beyond an edge of its respective insulating member 134, 136 and outwardly from opposite lateral sides 122 of the housing. This facilitates connection of the push-button switch S1 to the rest of the mirror control circuit.

Because the slot 116 extends between the opposite lateral sides 122 of the housing, the portion of each contact member which extends beyond the housing may be bent to define a slight shoulder 160 which engages the housing sides. This prevents the contact assembly 104 from moving laterally within the housing slot 116.

In the preferred form of the push-button switch S1, the actuator 102 is seated in its normal disposition with its tip portion 126 in contact with the second insulating member 136. Therefore, only slight movement of the actuator will displace the second contact member 132 sufficiently to bridge the gap between the contact members so that the two will contact to provide an electrical path to the switch. Thus, in the example given above, actuator movement of only 0.010 inches will actuate the switch. When pressure is released from the head portion 48 of the actuator, the resilience of the second contact member 132 will cause it to disengage from the first contact member 130 and return to its normal disposition, breaking the electrical path through the switch.

The push-button switch may be operated in its normally downward disposition, as shown in FIG. 1, or in the opposite disposition with the actuator 102 on top. This is because the actuator 102 is of minimal weight and will still return to its normal position due to the resiliency of the second contact member 132.

Although the illustrative embodiments of the present invention have been described herein with reference to the accompanying drawings, it is to be understood that the invention is not limited to those precise embodiments, and that various other changes and modifications may be effective therein by one skilled in the art without departing from the scope or spirit of the invention.

What is claimed is:

1. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;

(b) a reflective panel associated with said housing for movement between said higher reflectivity and lower reflectivity orientations, said panel providing higher reflectivity in the higher reflectivity orientation, and providing lower reflectivity in the lower reflectivity orientation;

(c) a motor having means to move a drive element in a first or second direction;

(d) means for actuation, said means being associated with said housing, for driving engagement with the drive element to move the panel between the higher and lower reflectivity orientations;

(e) electrical circuit means comprising photosensing means for determining the ambient light level about the automobile and the incident light level upon the reflective panel, and for generating electrical signals proportionately representative of said light levels thereof; said circuit means further comprising means for comparing the additive sum of said ambient light level signal and said incident light level signal to an independent voltage, the comparing means having an output; the circuit means having means for directing current through the motor to move the drive element and the actuation means to position the panel in the higher reflectivity orientation or lower reflectivity orientation in response to the output of the comparing means.

2. The automobile mirror assembly of claim 1 wherein said photosensing means comprises a first photosensor for detecting said ambient light level, and a second photosensor for detecting said incident light striking the reflective panel of said rearview mirror, and said circuit means comprises means for electrically connecting the first and second photosensors in a bridge.

3. The automobile mirror assembly of claim 2 wherein said circuit means including the bridge has means for directing electrical signals from said first and second photosensors to different portions of said automatic circuit.

4. The automobile mirror assembly of claim 1 wherein said circuit means further comprises an integration portion and a summer portion, said integration portion having means for integrating the ambient light level signal and the incident light level signal at different rates, said summer portion having means for adding the integrated signals from said integration portion, and means for electrically connecting the summer portion to the integration portion.

5. The automobile mirror assembly of claim 1 wherein said comparing means comprises a comparator having a hysteresis loop for preventing the mirror from switching from a lower to a higher reflectivity orientation for a short time interval immediately following switchover from a higher to a lower reflectivity orientation.

6. The automobile mirror assembly of claim 5 wherein the short time interval is approximately ten seconds.

7. An automobile variable reflectivity mirror assembly for mounting to an automobile structure and for use with an electrical power supply, the assembly being operable to provide at least a relatively higher reflectivity orientation and a relatively lower reflectivity orientation, comprising:

(a) a housing;

(b) a reflective panel associated with said housing for movement between said higher reflectivity and lower reflectivity orientations, said panel providing higher reflectivity in the higher reflectivity orientation, and providing lower reflectivity in the lower reflectivity orientation;

(c) a motor having means to move a drive element in a first or second direction;

(d) means for actuation, said means being associated with said housing, for driving engagement with the drive element to move the panel between the higher and lower reflectivity orientations;

(e) electrical circuit means comprising means for detecting the ambient light level about the automobile, for detecting the incident light level upon the reflective panel, and for generating electrical signals proportionately representative of said light levels, said circuit means further comprising means for directing current through the motor to move the drive element to position the reflective panel in the higher or lower reflectivity position, and an electrical bridge portion having means for automatically adjusting the sensitivity of the automatic circuit so that the level of incident light necessary to move the reflective panel from a high to a low reflectivity position decreases as the ambient light level decreases.

8. The automobile mirror assembly of claim 7 wherein said first photosensor and second photosensor are both phototransistors, the electrical bridge portion further comprising two resistors, the first of said resistors being electrically connected between the collectors of said phototransistors, and the second of said resistors being electrically connected between the emitters of said phototransistors, the electrical bridge having first and second output nodes defined by the emitter of said first phototransistor and the collector of said second phototransistor, respectively, said electrical bridge portion further having a power input node and a power output node, the power input node being defined by the collector of the first phototransistor, the power output node being defined by the emitter of said second phototransistor and having a resistor electrically connected therefrom, the power input node being at a higher potential than the power output node.

9. The automobile mirror assembly of claim 8 wherein said phototransistors are Photo Darlington transistors.

10. The automobile mirror assembly of claim 8 wherein said automatic circuit further includes a long-time integration portion having means for integrating the electrical signal at said first output node and a short-time integration portion having means for integrating the electrical signal at said second output node, said short-time integration portion having a substantially faster time response than said long-time integration portion.

11. The automobile mirror assembly of claim 10 wherein said automatic circuit means further comprises a summer means for combining the integrated signal from said first output node with the integrated signal from said second output node.

12. The automobile mirror assembly of claim 11 wherein said automatic circuit means further includes a comparing means for comparing the combination of said integrated signals to a fixed voltage; the circuit means having means for directing current through the motor to move the drive element and the actuation means to position the panel in the higher reflectivity orientation or lower reflectivity orientation in response to the output of the comparing means.

13. The automobile mirror assembly of claim 11 wherein said comparing means comprises a comparator, said comparator comprising an output node and an input node, and comprising a hysteresis portion, the hysteresis portion being connected between the output node and the input node of the comparator and having means for preventing the reflective panel from moving from a lower to a higher reflectivity position for a short time interval of at least approximately ten seconds immediately following switchover from a higher to a lower reflectivity position.

14. An automobile variable reflectivity mirror assembly for mounting to an automobile structure and for use with an electrical power supply, the assembly being operable to provide at least a relatively higher reflectivity orientation and a relatively lower reflectivity orientation, comprising:
  (a) a housing;
  (b) a reflective panel associated with said housing for movement between said higher reflectivity and lower reflectivity in the higher reflectivity orientation, and providing lower reflectivity in the lower reflectivity orientation;
  (c) a motor having means to move a drive element in a first or second direction;
  (d) means for actuation, said means being associated with said housing, for driving engagement with the drive element to move the panel between the higher and lower reflectivity orientations;
  (e) electrical circuit means comprising means for detecting the ambient light level about the automobile, for detecting the incident light level upon the reflective panel, and for generating electrical signals proportionately representative of said light levels, said detecting means comprises a first photosensor for detecting said ambient light level, and a second photosensor for detecting said incident light striking the reflective panel of said rearview mirror, said first and second photosensors are in an electrical bridge, said electrical bridge further comprises two resistors, said first and second photosensors each having a collector and an emitter, one of said two resistors being electrically connected between the collectors of said first and second photosensors, the other of said two resistors being electrically connected between the emitters of said photosensors.

15. The automobile mirror assembly of claim 14 wherein said electrical bridge further comprises a third resistor, said third resistor being electrically connected to the emitter of said first photosensor and to the collector of said second photosensor.

16. The automobile mirror assembly of claim 14 wherein said electrical bridge has output nodes defined by the emitter of said first photosensor and the collector of said second photosensor.

17. The automobile mirror assembly of claim 16 wherein said automatic circuit further comprises an integration portion and a summer portion, the integration portion having means for integrating the electrical signals at said output nodes at different rates, and means for electrically connecting said summer portion to said integration portion, the summer portion having means for adding the integrated signals from said integration portion.

18. The automobile mirror assembly of claim 17 wherein said automatic circuit further comprises a means for comparing the output of said summer portion to an independent fixed voltage, the comparing means having an output indicative of the reflectivity orientation of the reflective panel, the current being directed through the motor to move the reflective panel to the higher or lower orientation in response to the output of the comparing means.

19. The automobile mirror assembly of claim 18 wherein said comparing means is comprised of a comparator having a hysteresis loop which prevents the reflective panel from switching from a low to a high reflective orientation for a short time interval immediately following switchover from a high to a low reflectivity position.

20. The automobile mirror assembly of claim 19 wherein said short time interval is approximately ten seconds.

21. The assembly of claim 19 wherein the hysteresis loop comprises a branch with at least one resistor in parallel with a branch having at least one resistor and one capacitor.

22. An automobile variable reflectivity mirror assembly for mounting to an automobile structure and for use with an electrical power supply, the assembly being operable to provide at least a relatively higher reflectivity orientation and a relatively lower reflectivity orientation, comprising:
  (a) a housing;
  (b) a reflective panel associated with said housing for movement between said higher reflectivity and lower reflectivity orientations, said panel providing higher reflectivity in the higher reflectivity orientation, and providing lower reflectivity in the lower reflectivity orientation;
  (c) a motor having means to move a drive element in a first or second direction;
  (d) means for actuation, said means being associated with said housing, for driving engagement with the drive element to move the panel between the higher and lower reflectivity orientations;
  (e) electrical circuit means comprising photosensing means for determining the ambient light level about the automobile, and the incident light level upon the reflective panel, and for generating electrical signals proportionately representative of said light levels thereof; said electrical circuit means further comprising determining means which consists one integrated circuit, for with said one integrated circuit when said incident light level is sufficiently high with respect to said ambient light level such that said rearview mirror should be moved from the high reflectivity position to said low reflectivity position, said one integrated circuit of the determining means further being able to prevent switchover from high to low reflectivity during high ambient lighting conditions.

23. The automobile mirror assembly of claim 22 wherein said photosensing means comprises a first photosensor for detecting said ambient light and a second photosensor for detecting said incident light, said photosensors being connected in an electrical bridge arrangement, said determining means having means for summing said electrical signals representative of said ambient and incident light levels, said determining means further having means for comparing said summed signal to a fixed reference voltage.

24. The automobile mirror assembly of claim 23 wherein said electrical bridge comprises said first and second photosensors, each having a collector and emitter, and three resistors, one of said three resistors being electrically connected between the emitters of said first and second photosensors, another of said three resistors being electrically connected between the collectors of said first and second photosensors, and the remaining resistor being electrically connected to the emitter of said first phototransistor and to the collector of said second phototransistor.

25. The automobile mirror assembly of claim 23 wherein said first and second photosensors having outputs and said summing means comprises a node connecting said output of said first photosensor to the output of said second photosensor and said comparing means is a comparator, said comparator having two inputs and one output such that said summed signal is at one input of said comparator and said reference voltage is at the other input, wherein the output of said comparator is determinative of the position of said reflective panel of said rearview mirror and actuates said motor to drive said reflective panel between the high and low reflectivity positions.

26. The automobile mirror assembly of claim 25 wherein said circuit means further comprises an integration portion having means for integrating the ambient light level and the incident light level at different rates, said integration portion being electrically connected between the outputs of said first and second photosensors and said summing means.

27. The automobile mirror assembly of claim 25 wherein said electrical bridge comprises said first and second photosensors, each having a collector and emitter, and three resistors, one of said three resistors being electrically connected between the emitters of said first and second photosensors, another of said three resistors being electrically connected between the collectors of said first and second photosensors, and the remaining resistor being electrically connected to the emitter of said first phototransistor and to the collector of said second phototransistor.

28. The automobile mirror assembly of claim 27 wherein said output of said first photosensor is the emitter of said first photosensor and said output of said second phototransistor is the collector of said second photosensor.

* * * * *